United States Patent [19]

Schluenz et al.

[11] 4,107,420

[45] Aug. 15, 1978

[54] PROCESS FOR THE PREPARATION OF TERPENE-MALEIC ANHYDRIDE ADDUCTS

[75] Inventors: Robert William Schluenz; Curry Beach Davis, both of Panama City, Fla.

[73] Assignee: Arizona Chemical Company, Wayne, N.J.

[21] Appl. No.: 788,173

[22] Filed: Apr. 18, 1977

Related U.S. Application Data

[62] Division of Ser. No. 678,082, Apr. 19, 1976, Pat. No. 4,046,748.

[51] Int. Cl.$^2$ ............... C08F 4/00; C08F 222/04; C08F 236/00
[52] U.S. Cl. ............... 526/237; 260/346.22; 260/346.3; 260/346.6; 260/346.74; 260/823; 260/890; 526/271; 526/272; 528/322; 528/327; 528/345; 528/344

[58] Field of Search ............ 526/271, 272, 237; 260/346.6, 346.74, 346.3

[56] References Cited

U.S. PATENT DOCUMENTS

| | | | |
|---|---|---|---|
| 1,993,025 | 3/1935 | Peterson et al. | 526/272 |
| 1,993,031 | 3/1935 | Peterson | 526/237 |
| 2,344,831 | 3/1944 | Ott | 526/272 |
| 2,383,399 | 8/1945 | Lundquist | 526/272 |

*Primary Examiner*—Herbert J. Lilling
*Attorney, Agent, or Firm*—Harry H. Kline

[57] ABSTRACT

There is provided a process for preparing the reaction product of maleic anhydride with a non-conjugated monocyclic terpene in the presence of controlled amounts of iodine to attain a mixture of more than 15% di-adduct and the balance of said mixture being mono-adducts.

7 Claims, No Drawings

PROCESS FOR THE PREPARATION OF TERPENE-MALEIC ANHYDRIDE ADDUCTS

This is a division, of application Ser. No. 678,082, filed Apr. 19, 1976 now U.S. Pat. No. 4,046,748.

The present invention relates to a process for preparing maleic anhydride adducts of non-conjugated terpenes. More particularly, it relates to a process for preparing the reaction product of maleic anhydride with a non-conjugated monocyclic terpene. Still more particularly, the invention is concerned with a process for preparing at elevated temperatures the reaction product of maleic anhydride with a nonconjugated monocyclic terpene in the presence of controlled amounts of iodine to attain a mixture of more than 15% diadducts and the balance of said mixture being mono-adducts.

It is known that maleic anhydride and terpenes, both conjugated and unconjugated, can form maleic anhydride adducts under elevated temperatures. However, the yields of resultant adduct are unsatisfactory. It is also known that, if small amounts of mineral acid are present during adduct formation, non-conjugated terpenes can be readily used. Nonetheless, resultant yields are similarly unsatisfactory. If a process could be provided whereby substantial yields of di-adduct can be prepared in acceptable yields, such would fulfill a long felt need in the art.

It is, therefore, a principal object of the invention to provide a process for preparing substantial yields of di-adduct from non-conjugated terpenes and maleic anhydride. It is further, object of the invention to prepare diadducts in yields of more than 15% from nonconjugated terpenes and maleic anhydride. Other objects and advantages will become apparent from a reading of the following ensuing description.

According to the process of the present invention, a mixture containing more that 15% di-adducts and less than 85% mono-adducts is obtained by reacting a nonconjugated monocyclic terpene with maleic anhydride at elevated temperatures. The mixture so obtained finds utility as a curing agent for epoxy resins and in the manufacture of alkyd resins. The mixture can also be readily converted to resinous terpene maleimides having utility as a tackifier for neoprene adhesive formations.

In general, equimolar amounts of a suitable nonconjugated terpene and maleic acid anhydride are reacted at temperatures ranging from about 140° C. to 200° C. in the presence of from 0.005% to 0.03% iodine, based on the weight of the terpene. It has been found, however, that an excess of either the maleic anhydride or terpene can be employed without materially affecting the overall yields of respective adducts obtained.

Illustrative of the non-conjugated terpenes or dienes which can be employed herein are: limonene, terpinolene, terpineol, 1,4-para methadiene, 1.8-cineole, 1,4-cineole or mixtures of the same.

In order to facilitate a further understanding of the invention, the following examples are presented primarily for purposes of illustrating more specific details thereof. The invention is not to be deemed limited thereby except as defined in the claims. Unless otherwise noted, all parts are by weight.

EXAMPLE 1

To a suitable flask equipped with an overhead stirrer, additional funnel, thermometer, nitrogen inlet, and a condenser above a water trap filled with toluene which is placed above a short, packed column are added 588 parts of maleic anhydride and 30 parts (by volume) of toluene. The mixture is heated to 200° C. for about 30 minutes. During this time, the system is dried by the refluxing toluene-water azeotrope. The temperature is reduced to 170° C.–180° C., or below reflux, and 0.02%, based on the weight of the terpene to be added, or iodine is added. Next, 906 parts of terpene fraction containing about 90% terpinolene, the remainder being terpene hydrocarbons and mono-unsaturated, monocyclic terpene alcohols are added and maintained at a temperature of about 180° C. This temperature is raised to 190° C.–195° C. after addition of the latter terpene fraction. Reflux is maintained by periodic addition of toluene. Thereafter, the temperature is raised to 200° C. and held for 2 hours. The reaction mixture is cooled to 100° C. A distillation head is attached and vacuum then applied. The temperature is next raised to 160° C. and steam is introduced for a 15 minute stripping period at a temperature of about 200° C. whereby volatiles are removed.

There is recovered a yield of 1330 parts of a maleic anhydride terpene adduct mixture comprising 60% mono-adduct and about 40% di-adduct. The percentages are determined by gel permeation chromatography (GPC.). The resultant mixture obtained in about 86% yields is a pale yellow solid having the following properties:

| | |
|---|---|
| Color (Gardner, 50/50 acetone) | 1 |
| Equivalent Weight | 111 |
| Unsaponifiables, % | 3.5 |
| Specific Gravity, 25°/25° C. | 1.166 |
| Softening Point, ° C | 30 |
| Ash, % | 0.01 |

EXAMPLE 2

The process of Example 1 is repeated in every detail except that the terpene fraction therein is substituted by 930 parts of terpene fraction comprising about 40% terpinolene, 25% dipentene, 30% 1,8-cineole and the balance being terpene hydrocarbons and monocyclic, mono-unsaturated terpene alcohols.

Resultant adduct mixture which is recovered in a yield of about 85% is substantially the same as that obtained in Example 1.

EXAMPLE 3

Repeating the procedure of Example 1 in every detail except that 97% limonene is substituted in lieu of the terpene fraction mixture. There is obtained a terpene maleic anhydride adduct in a yield of about 90% having more than about 35% di-adduct in said mixture and being a light yellow solid.

EXAMPLE 4

The procedure of Example 1 is repeated in every detail except that no iodine is incorporated during the reaction.

There is recovered 1135 parts of terpene maleic anhydride adduct containing about 45% of di-adduct and about 55% of mono-adduct. This material is a dark yellow solid.

EXAMPLE 5

This example illustrates the continuous procedure for preparing the adduct mixture of the present invention.

Liquid maleic acid anhydride maintained at 100° C. and the liquid terpene fraction of Example 1 maintained at 20° C. to 25° C. and xylene are introduced into a suitable reactor as described in Example 1 in a ratio of 6.2/9.6/2.1, respectively. Prior to introduction, each is passed through a heat exchanger, the temperature raised to 120° C. and then discharged into a jacketted kettle with a reflux container containing a small initial charge of xylene. Iodine is separately fed into the kettle at a rate equal to 0.02 part per 100 parts of terpene. The contents of the kettle are stirred and the mixture is maintained at 170° C. by the dissipation of heat in the condenser and jacketted kettle. Any water formed is removed as an azeotrope from the reflux steam.

The product mixture overflows into a second reactor after a two hour residence time. The temperature in the second reactor is maintained at 200° C. for one hour and the mixture on overflow is vacuum steam stripped to yield the desired di-adduct. Charging of 6250 parts of maleic anhydride and 9600 parts of the terpinolene fraction results in a 90% yield of the adduct mixture which is a pale yellow solid containing a di- to mono-adduct ratio of 40/60, respectively.

Resultant product is stored as such or is converted directly to a terpene imide resin finding utility as a tackifier for neoprene adhesive formulations.

EXAMPLE 6

This example illustrates terpene-maleimide preparation.

The product of Example 5 is reacted under reflux temperatures with a stoichiometric amount of ethylene diamine which is added slowly, while stirring, to the mixture. Any formed water is removed as an azeotrope from the reflux stream. When the addition of the diamine is complete, the kettle temperature is raised to 240° C. by stripping of xylene and water is continuously removed as an azeotrope. After reaching 240° C. kettle temperature, the mixture is vaccuum steam stripped 3 hours to remove volatile oils. The stripped resin is then cooled and drumed or flaked and bagged.

Resultant yellow solid product whose softening point is 115° C. has a number average molecular weight equal to 704.

EXAMPLE 7

This example illustrated the use of a terpenemaleimide resin of Example 6 above as a tackifier for neoprene.

There is prepared a heat-activated contact cement by admixing the following ingredients:

| Material | Parts |
|---|---|
| Neoprene WRT | 50 |
| Magnesium oxide | 2 |
| Zinc oxide | 2.5 |
| Zinc dibutyl dithiocarbamate | 1 |
| Terpene Imide Resin (Ex. 6) | 20 |
| Toluene | 228 |

The formulation is next coated onto a mylar film and the toluene is removed by evaporation. The toluene-free film has essentially no tack. The so-treated film is cut in strips and heat sealed at 250° F. for 0.3 seconds at 10 psi to various substrates and the peel strength determined which is recorded in the table below:

TABLE 1

| COMPOSITION FILM | PEEL BOND |
|---|---|
| Mylar to Kraft | Fiber tear |
| Mylar to Cellophane | Good |
| Mylar to Mylar | Excellent |
| Mylar to Aluminum | Good |

Advantageously, the low-molecular weight terpene imide resins prepared in accordance with the process of the present invention possess the following overall properties:

| | |
|---|---|
| Softening Point, ° C | 110–130 |
| Color (Gardner, 50/50 Toluene | 10 |
| Acid Number | 5–10 |
| Molecular Weight | 650–750 |
| Appearance | Clear, amber resin |
| Cloud Point[a] ° C | >300 |
| Specific Gravity, 25°/25° C | 1.159 |
| Toluene Insoluables, % | 0.016 |

[a]Cloud point is determined by admixing 2.5 parts of resultant resin with 10 parts of a 1:1 mixture of Elvax ®150 (33% vinyl acetate-ethylene copolymer) and Ceratak ® (microcrystalline wax m.p. 165° F), melting to a clear melt and, allowing the melt to cool slowly until it clouds.

The terpene imide resins are soluble in aromatic hydrocarbons, chlorinated hydrocarbons, esters and ketones, but insoluble in ethers, alcohols and aliphatic hydrocarbons. Due to their molecular weight and compatibility as shown by a cloud point of more than 300° C., the resins find utility as tackifiers in polar formulations.

We claim:

1. A process for preparing maleic anhydride adduct from non-conjugated terpenes which comprises: reacting at temperatures between 140° C. and 200° C. substantially equimolar amounts of (a) a non-conjugated terpene or mixed non-conjugated terpenes and (b) maleic acid anhydride in the presence of from 0.002% to 0.03% iodine, based on the weight of the terpene, and recovering a mixture of less than 85% mono-adduct and more than 15% di-adduct of terpene maleic adducts.

2. The process according to claim 1 wherein the terpene is principally terpinolene.

3. The process according to claim 1 wherein the terpene mixture comprises principally terpinolene and cineole.

4. The process according to claim 1 wherein the terpene is limonene.

5. The process according to claim 1 wherein the iodine added is 0.02%, based on the weight of the terpene reactant.

6. The process according to claim 1 wherein the temperature employed is 200° C.

7. The process according to claim 1 wherein the process is conducted continuously.

* * * * *